A. F. PATTERSON.
SAW SET.
APPLICATION FILED MAR. 26, 1918.
1,280,079.
Patented Sept. 24, 1918.
2 SHEETS—SHEET 1.
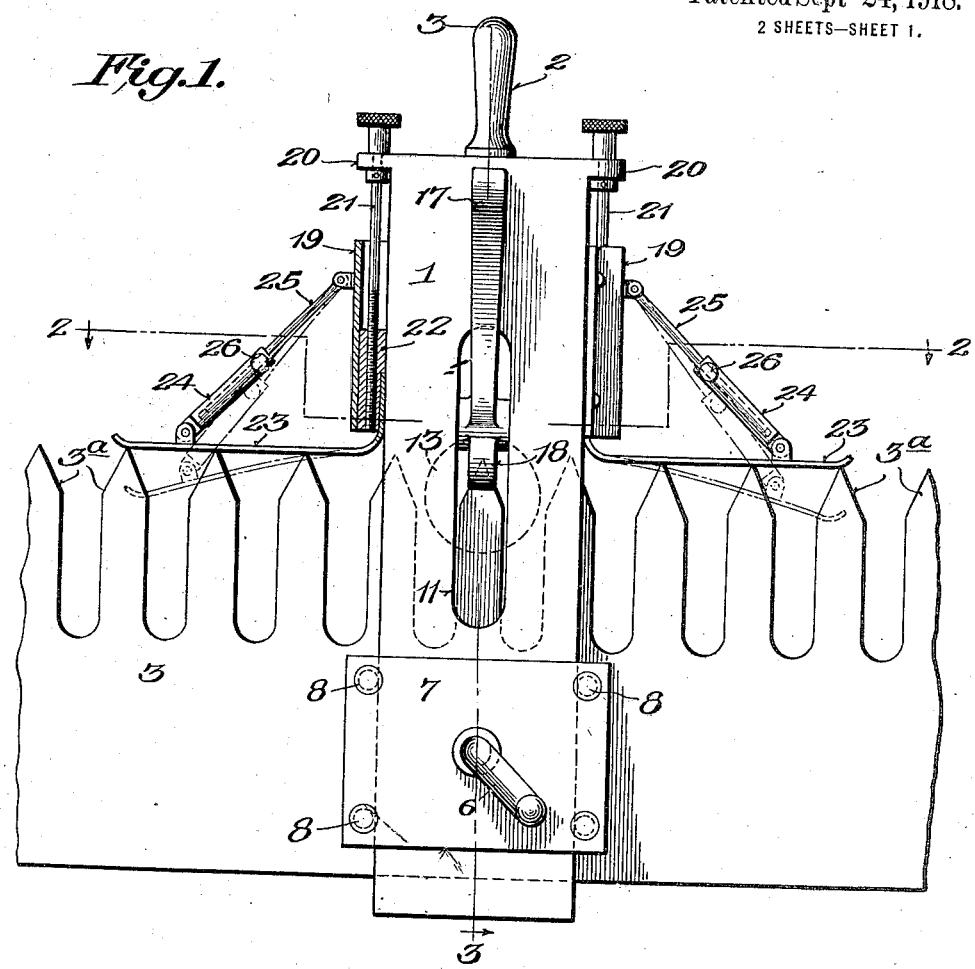
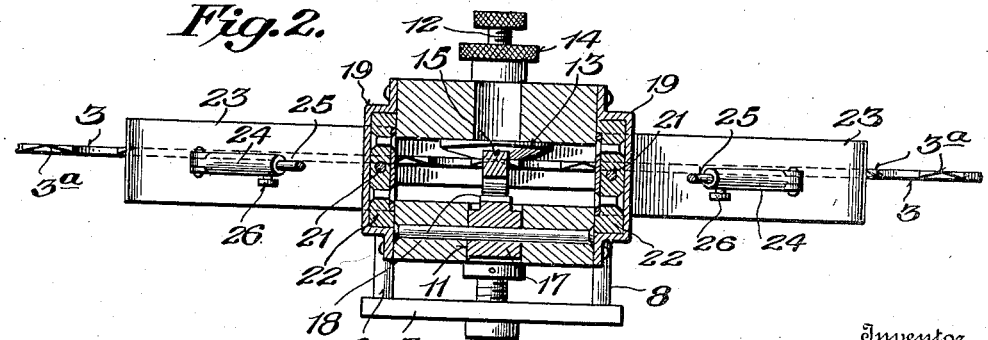
Witness
Chas. L. Griesbauer
Inventor
A. F. Patterson,
By G. B. McIlrath
Attorney

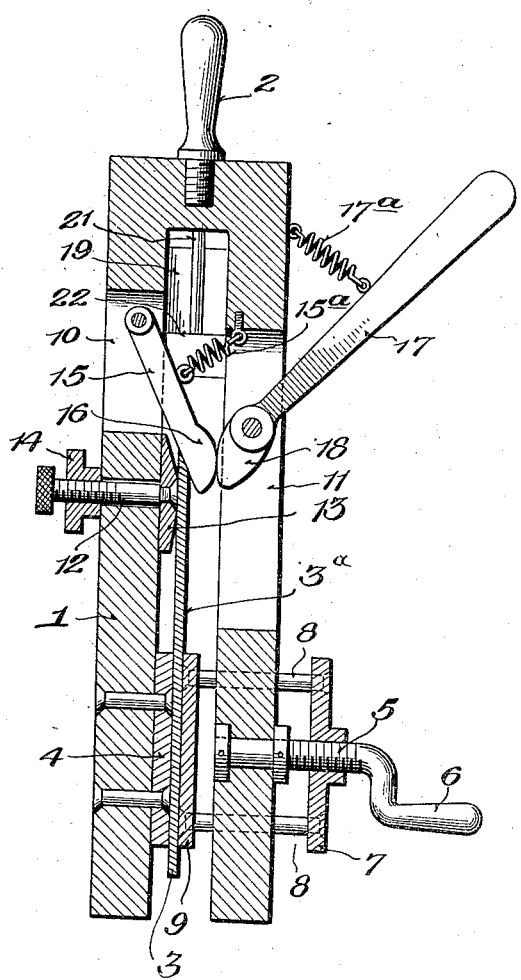
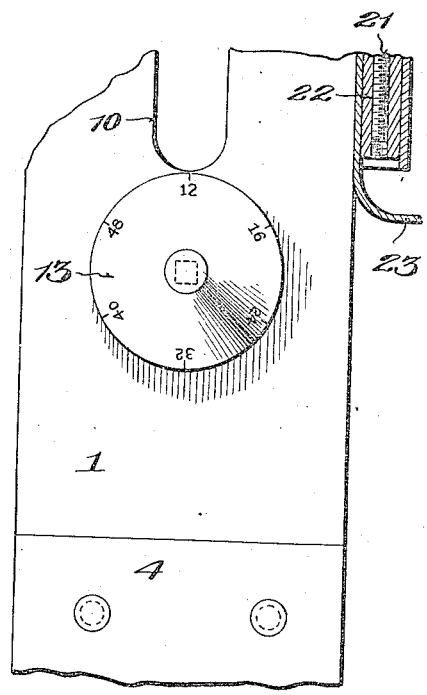

UNITED STATES PATENT OFFICE.

ARTHUR F. PATTERSON, OF PATTEN, MAINE.

SAW-SET.

1,280,079.  Specification of Letters Patent.  Patented Sept. 24, 1918.

Application filed March 26, 1918. Serial No. 224,698.

*To all whom it may concern:*

Be it known that I, ARTHUR F. PATTERSON, a citizen of the United States, residing at Patten, in the county of Penobscot and State of Maine, have invented certain new and useful Improvements in Saw-Sets, of which the following is a specification.

This invention relates to saw sets designed to operate on either straight or circular saws, and to set the teeth of the saw at any desired angle, with means for regulating the length of the set portion of the teeth, and finally for giving the same set to all of the teeth of the saw.

With these objects in view the invention consists in the novel features of construction hereinafter described, pointed out in the claims and shown in the accompanying drawings, in which:—

Figure 1 is a side elevation of the device applied to a saw having a straight cutting edge, the position occupied by certain parts in operating on a circular saw being shown in dotted lines.

Fig. 2 is a section on the line 2—2 of Fig. 1.

Fig. 3 is a section on the line 3—3 of Fig. 1.

Fig. 4 is a detail view, partly in section, showing the face of an anvil dial.

In the drawings 1 designates a bifurcated frame adapted to fit over a saw and having at the top a handle 2, the saw being designated at 3 with teeth 3ª. To clamp the frame to the saw I employ a wear plate 4 secured in the bifurcation of the frame, a swiveled threaded rod 5 having a handle portion 6, said rod being mounted in the lower portion of the frame, and a plate 7 working on the threaded handle and connected by rods 8 with a plate 9, the saw being gripped between plates 4 and 9, as most clearly shown in Fig. 3.

One member of the bifurcated frame 1 is slotted as at 10 and the other member as at 11.

Just below the slot 10 a threaded rod 12 having a knurled head at its outer end works loosely through the frame member and carries at its inner end, and within the bifurcation, a dial anvil 13. This anvil is in the form of a circular plate with a cam face, to regulate the angle at which the saw teeth are set, with suitable numerals marked thereon to indicate the extent of the set given the tooth by any particular portion of the dial face.

A knurled nut 14 working on the rod draws the dial anvil tightly against the inner face of the frame member and locks it in adjusted position. The cam dial is rotated by the operator turning the rod 12 by hand, first loosening the nut 14.

A lever 15 is pivoted in the slot 10 and at its lower free end has a cam portion 16 bearing on the anvil 14 or on the saw tooth 3ª after the saw is placed in position.

Preferably I hold the cam 16 normally out of contact with either the tooth or anvil by a spring 15ª connected at one end to the lever 15 and at the opposite end to the other member or side of the frame 1.

In the slot 11 is pivoted a handle 17 held in normal position by a spring 17ª and having a cam 18 adapted to be forced into engagement with cam 16, as in Fig. 3. In this position further downward movement of the lever 17 will cause the cam 16 to bend the saw tooth against the cam face of the dial 13, the inclination of the portion of the face engaged regulating the set of the tooth.

On its outer bifurcated faces the frame carries, in its upper portion angled guides 19. Through laterally projecting ears 20 work threaded rods 21 and thread blocks 22, slidably mounted in the guide plates 19 work on said rods. To these plates are secured spring saw tooth guards, 23, extending laterally from opposite sides of the frame 1.

These guards may be adjusted and regulate the extent to which the teeth of the saw lap over upon the dial anvil 13, thereby regulating the length or surface area of the set portion of the tooth, the cam surface of the anvil regulating the pitch given the set portion.

Adjustment vertically along the frame is given the guards by turning the rods 21 and sliding the thread blocks 22. The guards are also adjustable for curved or circular saws by means of sleeves 24 pivotally connected to the guards and bolts 25 pivotally connected to the angled guide plates 19 and which telescope in the sleeves, being locked in adjusted positions by set screws 26, or any other form of locking means.

The device shown and described can be quickly attached to a saw, the guards and anvil set to give the proper inclination to the teeth and to the extent desired, and after being so adjusted all of the saw teeth will be acted upon alike. The device can be readily reversed so as to act on both sides of the saw, setting a portion of the teeth in one direction and the remainder in the opposite direction, but with the same set assured for each tooth.

What I claim is:

1. In a saw set, a bifurcated frame adapted to receive a saw, an anvil, means coöperating with said anvil for bending the saw teeth, laterally extending guards carried by the frame and adapted to rest on the saw teeth, means for moving said guards along the frame and means for flexing said guards to fit a circular saw.

2. In a saw set, a bifurcated frame, saw tooth setting devices carried thereby, laterally extending adjustable guards adapted to limit movement of the saw longitudinally in the frame bifurcation, and means independent of said adjustment for flexing said guards.

In testimony whereof I affix my signature.

ARTHUR F. PATTERSON.

Copies of this patent may be obtained for five cents each, by addressing the "Commissioner of Patents, Washington, D. C."